United States Patent [19]
Wreede et al.

[11] Patent Number: 5,499,116
[45] Date of Patent: Mar. 12, 1996

[54] ENCODED HOLOGRAM FOR PRODUCING A MACHINE READABLE IMAGE AND A HUMAN READABLE IMAGE

[75] Inventors: John E. Wreede, Azusa; John E. Gunther, Torrance; Michael J. Virgadamo, Pasadena; Kevin Yu, Temple City; Lillian Yin, Alhambra; Jerry L. Mulder, Arcadia; Richard B. Upper, Sherman Oaks; James E. Scott, Hermosa Beach, all of Calif.

[73] Assignee: Hughes Aircraft Company, Los Angeles, Calif.

[21] Appl. No.: 114,538

[22] Filed: Aug. 31, 1993

[51] Int. Cl.⁶ .............................. G03H 1/00; B42D 15/00
[52] U.S. Cl. .................. 359/2; 359/10; 359/24; 359/30; 359/22; 283/86
[58] Field of Search ................ 359/1, 2, 10, 15, 359/22, 24, 27, 30; 283/85, 86

[56] References Cited

U.S. PATENT DOCUMENTS

| | | | |
|---|---|---|---|
| 4,880,286 | 11/1989 | Ih | 359/9 |
| 5,111,312 | 5/1992 | Stewart | 359/30 |
| 5,145,212 | 9/1992 | Mallik | 259/2 |
| 5,319,476 | 6/1994 | Yamazaki et al. | 359/2 |

*Primary Examiner*—Frank Gonzalez
*Assistant Examiner*—Jason D. Eisenberg
*Attorney, Agent, or Firm*—Leonard A. Alkov; W. K. Denson-Low

[57] ABSTRACT

An encoded hologram that produces a first image and a second image pursuant to playback illumination, wherein the first image is resolvable by human vision while the second image is not resolvable by human vision when the playback illumination comprises non-coherent broad band illumination, and wherein the second image is machine readable when the hologram is illuminated with playback illumination that is based on the original reference beam.

33 Claims, 5 Drawing Sheets

ENCODED HOLOGRAM FOR PRODUCING A MACHINE READABLE IMAGE AND A HUMAN READABLE IMAGE

BACKGROUND OF THE INVENTION

The subject invention is directed generally to hologram structures, and more particularly to an encoded hologram for laminated identification cards and the like which contains human viewable information as well as machine readable indicia that is substantially incapable of being resolved by human vision.

Laminated identification cards such as those containing a photograph of the authorized card holder are widely used for security purposes. Laminated identification cards commonly include other human readable information as well as machine readable information contained on a magnetic strip for example.

An important consideration with laminated identification cards is counterfeiting and/or tampering. One approach to preventing counterfeiting and/or tampering is to incorporate human or machine readable holograms that are difficult to remove into laminated identification cards so that tampering would result in damage to the hologram which would be rendered unreadable. Counterfeiting is prevented by utilizing a hologram whose construction is difficult to ascertain, whose presence is difficult to ascertain, or which is difficult to copy. However, the provision of both human readable and machine readable holograms in accordance with known techniques requires two or more holograms.

SUMMARY OF THE INVENTION

It would therefore be an advantage to provide a hologram structure that contains in a single hologram both human readable information and machine readable information.

Another advantage would be to provide a hologram structure that contains in a single hologram both human readable information and machine readable information that is substantially incapable of being resolved by human vision.

A further advantage would be to provide a hologram structure that contains in a single hologram human readable information and machine readable information which is masked by the presence of the human readable information.

The foregoing and other advantages are provided by the invention in an encoded hologram that produces a first image and a second image pursuant to playback illumination, wherein the first image is resolvable by human vision while the second image is not resolvable by human vision when the playback illumination does not emulate the original reference beam utilized for construction as defined by the well-known grating equation, and wherein the second image is machine readable when the hologram is illuminated with playback illumination that emulates the original reference beam as defined by well-known grating equation.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION OF THE DISCLOSURE

In the following detailed description and in the several figures of the drawing, like elements are identified with like reference numerals.

Figure 1A:
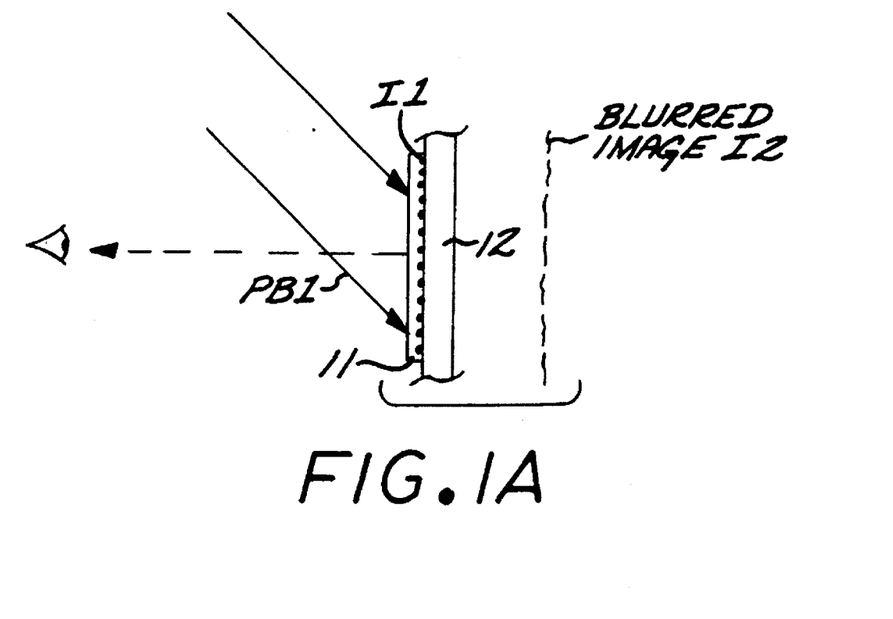
FIG. 1A schematically illustrates the playback of a reflection hologram in accordance with the invention with a broad band light source which produces a first image that is resolvable by human vision and a second image that is not readily resolved by human vision.
Figure 1B:
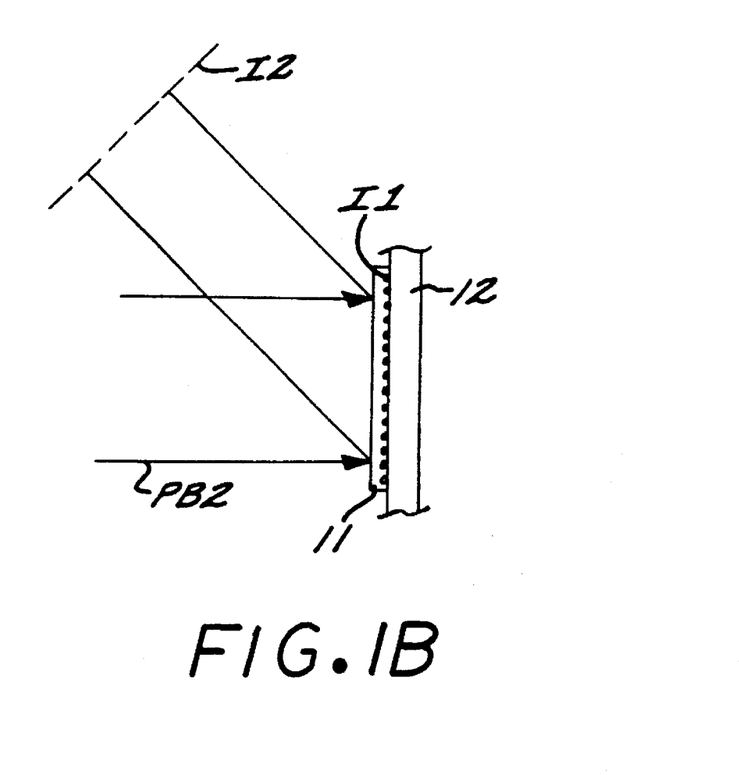
FIG. 1B schematically illustrates the playback of the reflection hologram of FIG. 1A with a suitable narrow band light source which produces the second image such that it can be machine read.

FIGS. 1A and 1B schematically illustrate the operation of an encoded hologram in accordance with the invention which comprises a reflection hologram 11 that contains hologram fringes for producing a first image I1 (indicated by a line of dots) and a second image I2 (indicated by a dashed line) pursuant to playback illumination. The reflection hologram 11 is supported on an opaque substrate 12 that comprises a credit card or the core of an identification card, for example. Referring in particular to FIG. 1A, for a first playback beam PB1 having an incidence angle, waveform, and wavelength that are based on the original object beam angle, the first image I1 is a real image located at the plane of the hologram 11 and viewable from an angle that is generally normal to the hologram, and the second image I1 is a blurred virtual image displaced from the non-hologram side of the opaque substrate 12. Referring in particular to FIG. 1B, for a second playback beam PB2 that has an incidence angle, a wavefront, and a wavelength that are based on the original reference beam, the first image I1 is a real image located at the plane of the hologram while the second image I2 is a real image that is displaced from the hologram 11 as shown in FIG. 1B.

By way of illustrative example, the first image I1 comprises a diffuser configured in a recognizable shape such as a company logo or name, and the second image I2 comprises a bar code, a two-dimensional image of a likeness of an object or a person's face, and/or alpha-numeric characters. To the extent that the first image comprises a diffuser, the reflection hologram can be configured to focus the first image at a location that is displaced from the hologram about 1 inch or so.

The second image I2, when reconstructed pursuant to a playback beam PB2 that is based on the original reference, can be optically analyzed by machine, and/or projected onto a screen for viewing by human vision.

The particular nature of the playback beams PB1 and PB2 depends upon the the particular construction of the encoded hologram 11. In particular, if the hologram is constructed with the object corresponding to the second image I2 located on the reference beam side of the holographic recording layer, the playback beam PB1 emulates the conjugate of the original object beam angle utilized for construction of the hologram as defined by the well-known grating equation, while the playback beam PB2 emulates the original reference beam as defined by the well-known grating equation.

If the hologram is constructed with the object corresponding to the second image I2 located on the object beam side of the holographic recording layer, the playback beam PB1 emulates the original object beam utilized for construction of the hologram as defined by the well-known grating equation, while the playback beam PB2 emulates the conjugate of the original reference beam as defined by the well-known grating equation. For example, if the original reference beam is a diverging beam, then the playback beam PB2 is a converging beam.

As schematically depicted in FIGS. 1A and 1B, the original reference beam angle is close to normal while the original object beam angle is generally in the central range between normal and perpendicular to normal such that the playback beam PB1 could be provided by overhead lighting when a viewer is reading the card that contains the encoded hologram.

In accordance with the invention, the hologram fringes for the first image I1 and the second image I2 are recorded simultaneously, and in such a manner that the first image I1 is resolvable by human vision while the second image I2 is not resolvable by human vision when the hologram is reconstructed with the use of non-coherent broadband light as the playback beam PB1. Further, the second image I2 is difficult if not impossible to resolve by human vision pursuant to reconstruction by any illumination that is not based on the original reference beam. When the hologram is reconstructed with the playback beam PB2 which emulates the reference beam or the conjugate of the reference beam, as defined by the grating equation, the second image I2 is machine readable but is still difficult to resolve by human vision unless the emulation of the reference beam or the conjugate of the reference beam is nearly perfect. For such nearly perfect emulation, the light must be monochromatic, with the precise spectral bandwidth required depending on the distance of the second image from the hologram, and on the required resolution of the image. Also, the light must match the reference beam in wavefront shape and distance from the source. The light source need not be a laser as utilized in construction, but a laser will provide the best quality image. As an example of the difficulty of achieving nearly perfect emulation to produce a second image resolvable by human vision, a resolvable reconstruction of a bar code image displaced two inches from the hologram could not be produced with a laser diode at the correct position.

There are several reasons for the extreme difficulty of visually resolving the second image I2 when the encoded hologram is reconstructed with non-coherent broad band generally white ambient light. Primarily, the second image is blurred as a result of (a) chromatic dispersion due to the wide bandwidth of white light and the displacement of the image from the encoded hologram and (b) image displacement blurring due to the source or sources of the generally white ambient light being distributed over a relatively large area. In other words, the second image is replicated overlappingly at a large number of places in different colors in the viewer's field of view such that the image cannot be resolved. Further, to the extent the playback illumination is sufficiently close to emulating the original object beam or the conjugate of the object beam, as defined by the grating equation, to produce a resolvable first image, both images will be blurred, but since the first image is resolvable, the viewer will tend to see the first image only and disregard the second image. Also, to the extent that the second image is comprised of high resolution components such as a bar code, the second image is even more difficult to resolve by human vision. Still further, to the extent that the first and second images are at different depths, and the first image is readily resolved by human vision, a viewer will tend to see the first image.

For the particular example wherein the encoded reflection hologram had been constructed with a collimated reference beam, even if a small collimated source such as a laser were utilized to reconstruct part of the hologram, the second image would not be resolvable because of the characteristic speckle noise effect pattern in the image.

Essentially, the second image is difficult to detect without illuminating the encoded hologram with a playback beam that is based on the original reference beam. However, in accordance with a further aspect of the invention, the original reference beam utilized for construction can comprise an appropriate wavefront that requires a converging wavefront for machine readable playback of the second image, since a converging wavefront is less likely to occur naturally, which makes the second image less likely to be detected or read, and which would require further investigation to find the proper cone angle to be able to read the code of the second image. The appropriate reference beam wavefront shape would be a converging beam for the implementation wherein the playback beam PB2 emulates the original reference beam as defined by the grating equation. For the implementation wherein the playback beam PB2 emulates the conjugate of the original reference beam as defined by the grating equation, the wavefront shape of the reference beam would be diverging beam. As a further alternative, the encoded hologram could be configured to require a diverging playback beam for machine readable reconstruction of the second image, which would require investigation to find the proper cone angle to be able to produce a machine readable image of the second image.

The first image, on the other hand, comprises an image of a diffuse object as viewed through an aperture formed by the boundaries of the hologram wherein the edges of the diffuse object are not visible. Accordingly, the first image is resolvable since it is the shape and position of the hologram itself. If the color of the playback illumination is changed, the angle at which the image can be viewed changes, but not the shape, except at high viewing angles wherein the shape changes due to foreshortening but is still resolvable. If the playback illumination comprises incoherent or white light, the first image appears as different colors at different angles, but the image is always located at the same place. Viewed another way, the diffuser image looks like a diffuse light source that is masked by the boundaries of the hologram. Viewed still another way, the boundaries of the hologram act like windows through which diffuse light passes.

Figure 2:
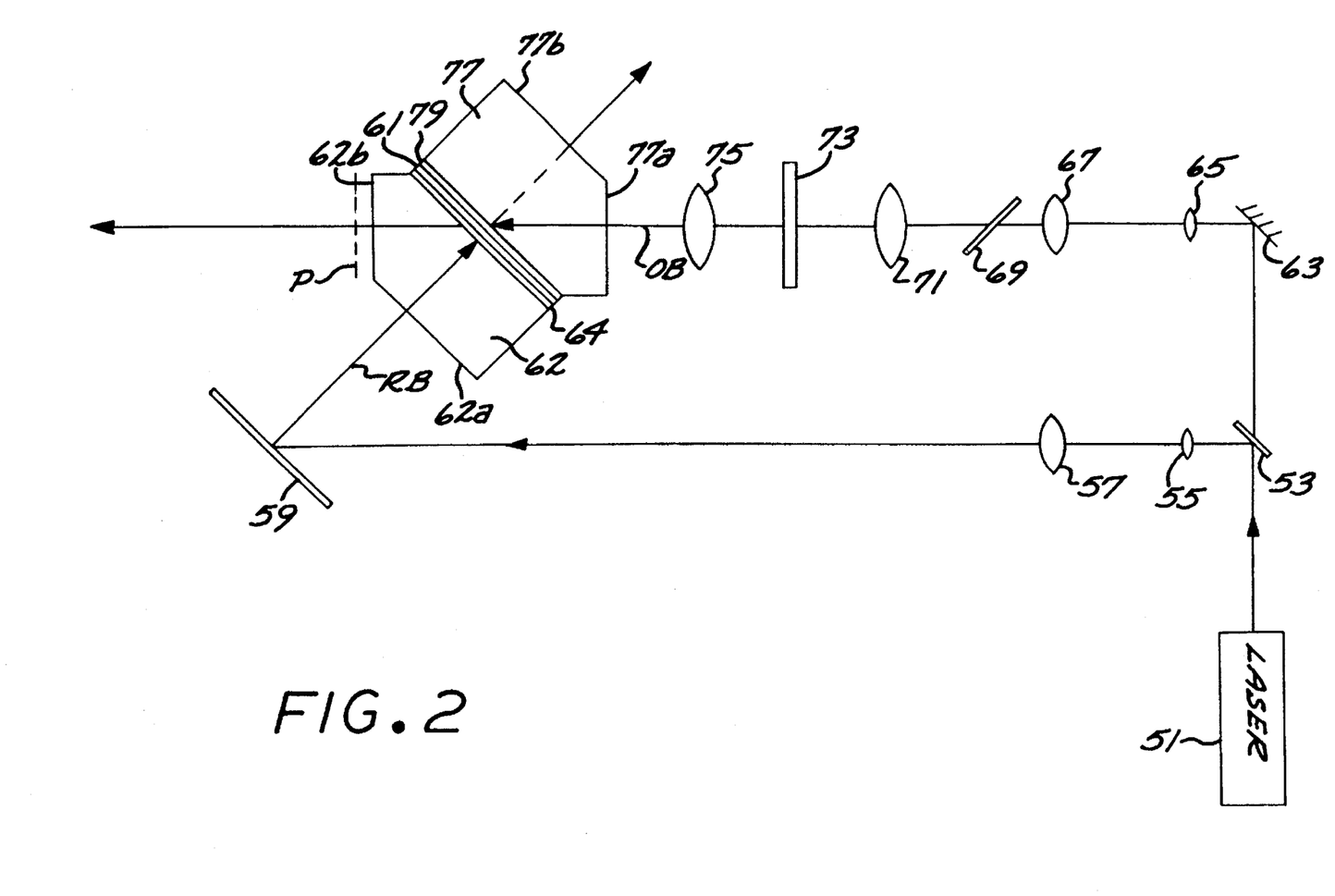
FIG. 2 schematically illustrates an exposure system for constructing the reflection hologram of FIGS. 1A and 1B.

Referring now to FIG. 2, set forth therein is an example of an exposure system which can be utilized to construct the encoded reflection hologram 11 of FIGS. 1A and 1B. The exposure system includes a laser 51 whose output is directed to a beamsplitter 53 which provides a reflected output and a transmitted output. The reflected output of the beamsplitter 53 is provided to a spatial filter 55 which produces a diverging beam that is provided to a double convex lens 57. The output of the double convex lens 57 is directed a light bending mirror 59 whose reflected output comprises a reference beam RB that is incident on a face 62a of a reflection reducing prism 62 and is optically coupled to a holographic recording layer 61 via the reflection reducing prism 62 and a layer of index matching fluid 64 interposed between the prism 62 and the holographic recording layer 61. The prism face 62a is configured to be orthogonal to the optical axis of the reference beam RB, and the prism 62 is made sufficiently large so that the reference beam RB enters only at the prism face 62a and so that an object beam OB, described further herein, exits only at a prism face 62b that is adjacent the prism face 62a. The reference beam RB that passes through the prism 62 and the index matching fluid 64 is incident on the holographic recording layer 61 at a reference beam angle that is close to normal relative to the recording layer 61.

By way of illustrative example, the reference beam RB can be collimated, converging, or diverging, which can be controlled by the location of the double convex lens 57 relative to the spatial filter 55 and/or the presence of the spatial filter 55. For example, the double convex lens 57 can be positioned at its focal length away from the spatial filter to produce a collimated output. If the double convex lens 57 is moved toward the spatial filter, its output will become diverging. A diverging reference beam can also be produced by eliminating the lens 57 and positioning the spatial filter 55 closer to the mirror 59. As another alternative, a diverging reference beam can be produced by eliminating the spatial filter 55, and moving the double convex lens 57 toward the light bending element 59 and/or changing the focal length of the double convex lens 57. A converging beam is produced by moving the double convex lens 57 away from the spatial filter, relative to the position of the convex lens 57 when located at its focal length away from the spatial filter.

The transmitted output of the beamsplitter 53 is directed by a light bending mirror 63 to a spatial filter 65 which produces a diverging output that is provided to a collimating lens 67. The output of the collimating lens 67 is provided to a diffuser 69 whose diffuse output is provided to a first double convex spherical imaging lens 71. The output of the imaging lens 71 is directed to a transmissive masking apparatus 73 whose masked output, which is comprised of a pattern of light and dark areas, is provided to a second double convex spherical imaging lens 75. The output of the imaging lens 75 comprises an object beam that is incident on a face 77a of a reflection reducing prism 77 and is optically coupled to the holographic recording layer 61 via the reflection reducing prism 77 and a layer of index matching fluid 79 interposed between the prism 77 and the holographic recording layer 61. The object beam OB that passes through the prism 77 and the index matching fluid 79 is incident on the holographic recording layer 61 at angle that is appropriate for playback of the first image of the hologram of the hologram of FIG. 1A pursuant to a playback beam that is the conjugate of the object beam OB. In particular, such conjugate playback beam is in the central range between normal and parallel to the hologram. The prism face 77a is configured to be normal to the optical axis of the object beam OB, and the prism 77 is made sufficiently large so that the object beam OB enters only at the prism face 77a and so that the reference beam RB exits only at a prism face 77b that is adjacent the prism face 77a after such reference beam passes through the holographic recording layer 61, the index matching fluid 77 and the prism 77. The object beam OB passes through the holographic recording layer 61, the index matching fluid 64, the prism 62, and exits the prism face 62b. As described earlier, the prism 62 is made sufficiently large so that the object beam OB exits only at the prism face 62b.

The focal lengths of the first and second imaging lenses 71, 75 and the locations of the diffuser 69, the masking apparatus 73 and the holographic recording layer 61 are configured so that the image of the diffuser 69 is located substantially at the holographic recording layer 61, and the image of the masking apparatus 73 (i.e., the light and dark areas created thereby) is located at a position P that is at least about 1 or 2 inches away from the holographic recording layer 61, as shown in FIG. 2.

In accordance with the invention, the diffuser 69 and the holographic recording layer 61 are configured to record a first holographic image that is visible to a viewer pursuant to playback with generally white ambient light that is at an angle that is generally the conjugate of the object beam angle, as described above relative to FIG. 1A. For example, the first holographic image can comprise an image of diffuser in the form of a company name or logo, which can be achieved by rendering inert portions of the holographic recording layer so that the region in which the hologram is recorded in the form of the desired company name or logo.

In FIG. 2, the diffuser 69 is tilted appropriately so that the image of the diffuser is at the plane of the holographic recording layer, which is also tilted relative to the object beam OB. In particular, the tilt of the diffuser 69 is configured for a single image reversal since the first and second imaging lenses are sufficiently close such that only a single image reversal occurs. It should be appreciated that the object distance to image distance ratio for the diffuser is not necessarily 1 to 1, and thus the tilt of the diffuser can be different from the tilt of the holographic recording layer.

It is noted that while it may be desirable to locate the image of the diffuser at the plane of the holographic recording layer, that is not a requirement since the viewer's eye would be able to focus on the shape of the recorded hologram instead of the diffuse light diffracted by the hologram. However, where the image of the diffuser is not at the plane of the holographic recording layer, non-uniformities in the diffuse light of the hologram might tend to confuse the viewer's brain since the viewer's eyes could focus on the non-uniformities, which would be displaced placed from the hologram layer, and the shape of the recorded hologram would no longer seem sharp. Further, if the diffuser image is sufficiently displaced from the hologram layer, the non-uniformities would be blurred by dispersion. Thus, the image of the diffuser should generally be located at the plane of the holographic recording layer.

Further in accordance with the invention, the masking apparatus 73 contains a mask pattern that produces a pattern of light and dark areas which is recorded as a second holographic image that is machine readable or projectable pursuant to the playback beam PB2 which emulates the reference beam RB, as described above relative to FIG. 1B. For example, the mask pattern can comprise a bar code pattern which is recorded in the active areas of the holographic recording layer, for example where such active areas are in the form of a recognizable name or logo as described previously. Alternatively, the mask pattern can comprise a likeness of the face of a person (much like a photograph) whose identification is to include the reflection hologram being constructed, or the likeness of an object such a manufactured part in an application wherein the hologram is utilized to prove origin of the part, for example. The mask pattern can also include alphanumeric characters in addition to the bar code pattern or the photograph like pattern, for example for serialization of the holograms. By way of particular illustrative example, the transmissive masking apparatus 73 can comprise a film or transparency mask or a variable mask that is electrically controllable to have transparent and opaque pixels, such as an LCD.

As an alternative to locating the masking apparatus 73 between the two imaging lenses, the exposure system could be simplified by having the masking apparatus 73 immediately adjacent the diffuser, in which case the mask and the diffuser are imaged at about 1 inch on the other side of the hologram recording layer. Upon playback, while the image of the diffuser will not be focused at the hologram, the image of the diffuser will appear to be in focus at the hologram plane since the diffuser image will look like a diffuse light source that is shaped by the boundaries of the diffuser image, as discussed above.

Figure 3:
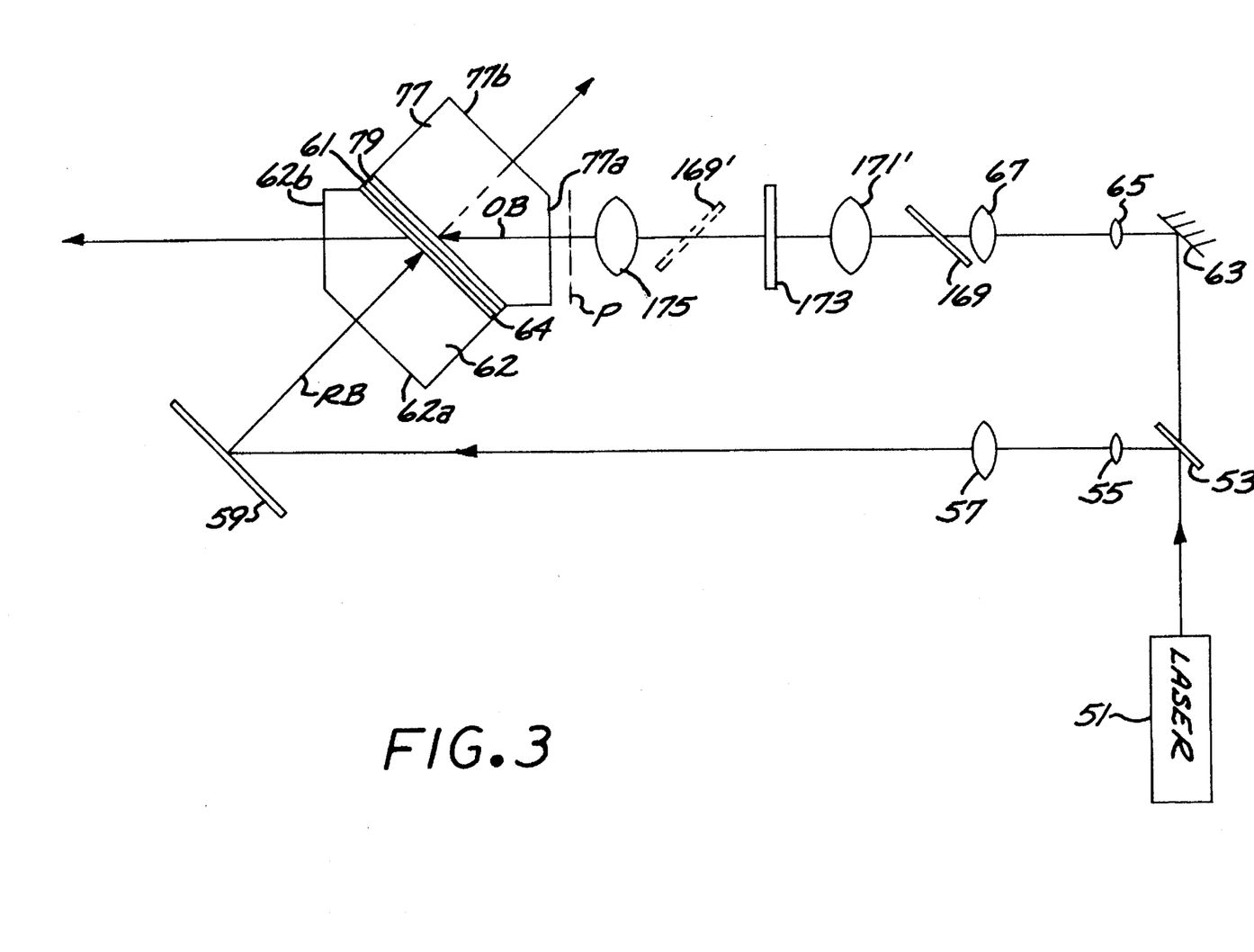
FIG. 3 schematically illustrates another exposure system for constructing a reflection hologram in accordance with the invention.

Referring now to FIG. 3, schematically set forth therein is an exposure system for constructing an encoded hologram in accordance with the invention which produces a first image pursuant to playback illumination that emulates the original object beam as defined by the grating equation, and produces a second image that is on the playback illumination side of the hologram pursuant to playback illumination that emulates the conjugate of the reference beam as defined by the grating equation. In particular, the reference beam side of an encoded hologram made in accordance with the system of FIG. 3 is secured to an opaque substrate so that the object beam side thereof can be illuminated with playback illumination. Such playback illumination comprises non-coherent broad band illumination for playback of the first image, or an emulation of the conjugate of the reference beam for machine readable playback of the encoded second image. The exposure system of FIG. 3 differs from the exposure system of FIG. 2 as to the object beam optical components between the output of the collimating lens 67 and the prism 77. In particular, the output of the collimating lens is received by a diffuser 169 whose output is imaged by an imaging lens 171 to produce an image 169' of the diffuser 169 at a position that is between the imaging lens 171 and a further imaging lens 175 which images the diffuser image 169 at an image position located at the holographic recording layer. A transmissive masking apparatus 173 is located between the imaging lens 171 and the diffuser image 169', and the imaging lens 175 further images the output of the masking apparatus 173 at a location P that is 1 to 2 inches in front of the object beam side of the holographic recording layer.

Figure 4:
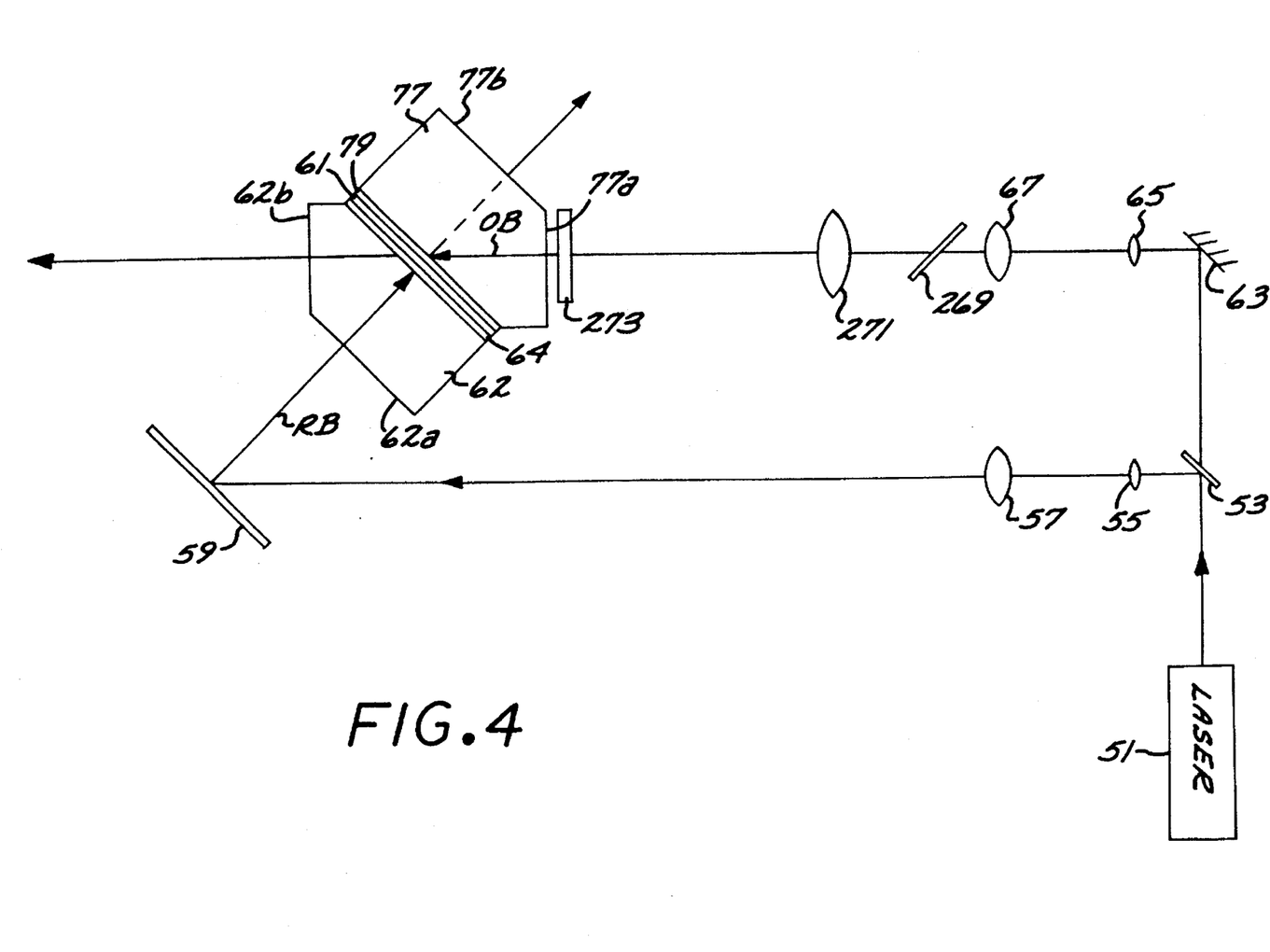
FIG. 4 schematically illustrates a further exposure system for constructing a reflection hologram in accordance with the invention.

Referring now to FIG. 4, schematically set forth therein is another exposure system for constructing an encoded hologram in accordance with the invention which produces a first image pursuant to playback illumination that emulates the original object beam as defined by the grating equation, and produces a second image that is on the playback illumination side of the hologram pursuant to playback illumination that emulates the conjugate of the reference beam as defined by the grating equation. The exposure system of FIG. 4 differs from the exposure system of FIG. 2 as to the object beam optical components between the output of the collimating lens 67 and the prism 77. In particular, the output of the collimating lens 67 is received by a diffuser 269 which is imaged by an imaging lens 271 onto the holographic recording layer 61. A transmissive masking apparatus 273 is located between the imaging lens 271 and the holographic recording layer 61 at a location is 1 to 2 inches in front of the object beam side of the holographic recording layer 61.

Figure 5:
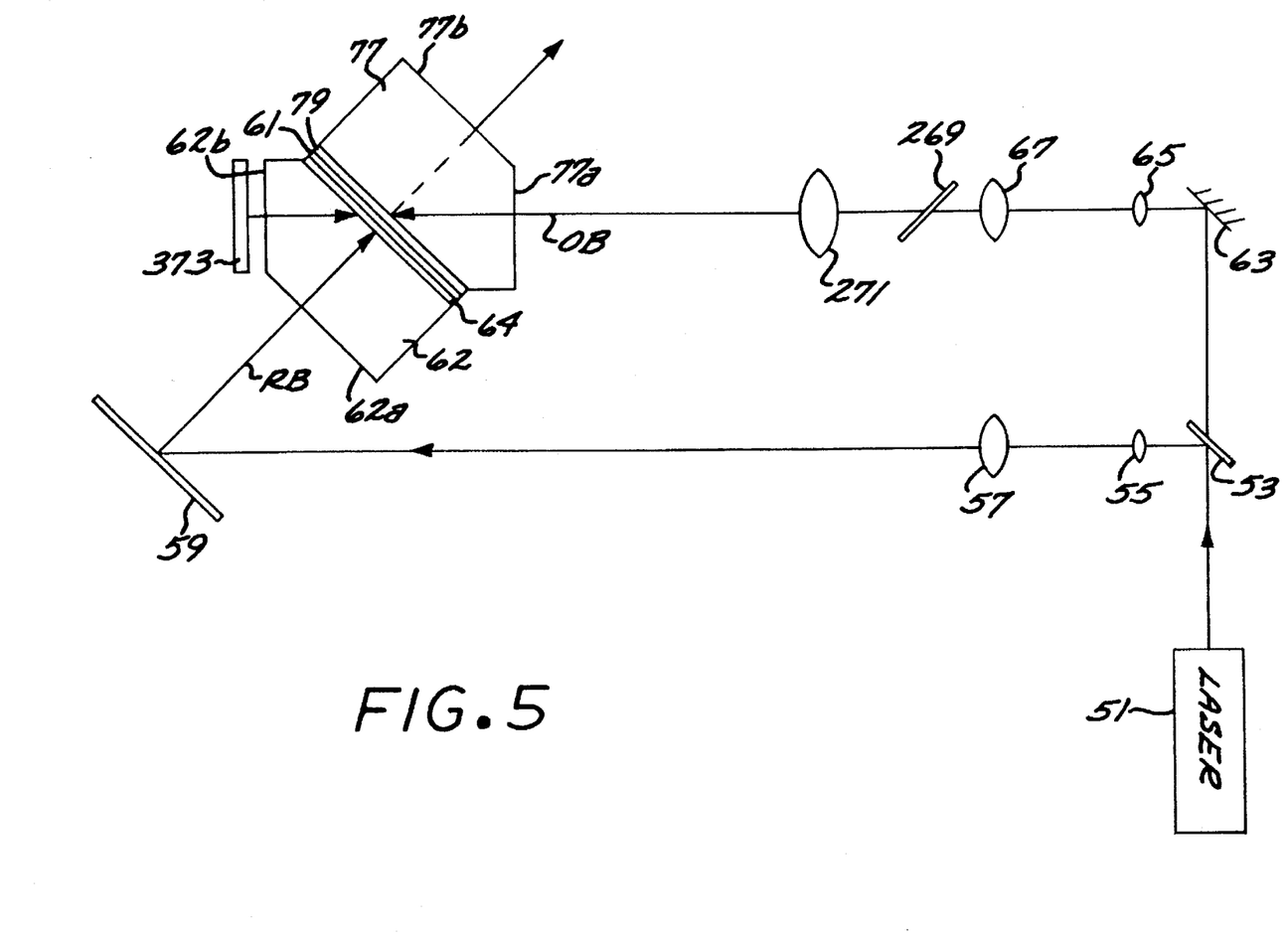
FIG. 5 schematically illustrates an exposure system for constructing a hologram in accordance with the invention which produces a first image that is resolvable by human vision and a second image that is not readily resolved by human vision.

Referring now to FIG. 5, schematically set forth therein is an exposure system for constructing an encoded hologram in accordance with the invention that is secured to a transparent substrate and produces a first image pursuant to playback illumination that emulates a first object beam as defined by the grating equation, and produces a second image pursuant to playback illumination that emulates the conjugate of the reference beam as defined by the grating equation. The exposure system of FIG. 5 differs from the exposure system of FIG. 2 as to the object beam optical components between the output of the collimating lens 67 and the prism 77 and as to the inclusion of a second object beam that forms a transmission hologram pursuant to interference with the reference beam and also forms a reflection hologram pursuant to interference with the first object beam. In particular, the output of the collimating lens 67 is received by a diffuser 269 whose output is imaged by an imaging lens 271 onto the holographic recording layer 61. A reflective masking apparatus 373 located about 1 to 2 inches in front of the reference beam side of the holographic recording layer 61 and is illuminated with the light output of the imaging lens 271 that passes through the holographic recording layer. The light scattered by the reflective masking apparatus comprises a second object beam OB2 that is incident on the prism face 62b and is optically coupled to the holographic recording layer 61 via the prism 62 and the index matching fluid 64. The reflective masking apparatus comprises a pattern of dark and light areas that form a bar code, a dimensional likeness of a person's face, a 2-dimensional likeness of an object, and/or alphanumeric characters, similarly to the transmissive masking apparatus of the previously discussed exposure systems. By way of particular illustrative example, the reflective masking apparatus 273 can comprise a fixed mask pattern of light and dark areas or a variable mask that is electrically controllable to have light and dark pixels, such as an LCD.

The foregoing has been a disclosure of a hologram structure that contains in a single hologram both human readable information and machine readable information that is substantially incapable of being resolved by human vision and is masked by the presence of the human readable information.

Although the foregoing has been a description and illustration of specific embodiments of the invention, various modifications and changes thereto can be made by persons skilled in the art without departing from the scope and spirit of the invention as defined by the following claims.

What is claimed is:

1. A hologram recorded pursuant to an original reference beam and an original object beam, the hologram comprising hologram fringes recorded pursuant to a single exposure for producing (a) a first image pursuant to playback illumination, said first image being resolvable by human vision when produced pursuant to first playback illumination comprised of non-coherent broadband illumination, and (b) a second image pursuant to playback illumination, said second image being displaced from the hologram and unresolvable by human vision when produced pursuant to playback illumination that does not emulate the original reference beam as defined by a grating equation but being machine readable when produced pursuant to playback illumination that emulates the original reference beam as defined by the grating equation.

2. The hologram of claim 1 wherein said first image comprises an image of a diffuser.

3. The hologram of claim 1 wherein said second image comprises an image of a bar code.

4. The hologram of claim 1 wherein said second image comprises an image of a person's face.

5. The hologram of claim 1 wherein said second image comprises an image of alphanumeric characters.

6. A hologram recorded pursuant to an original converging reference beam and an original object beam, the hologram comprising hologram fringes recorded pursuant to a single exposure for producing (a) a first image that is produced pursuant to playback illumination, said first image being resolvable by human vision when produced pursuant to non-coherent broad band playback illumination, and (b) a second image that is produced pursuant to playback illumination, said second image being displaced from the hologram and unresolvable by human vision when produced pursuant to playback illumination that does not emulate the original converging reference beam as defined by a grating equation but being machine readable when produced pursuant to playback illumination that emulates the original converging reference beam as defined by the grating equation.

7. The hologram of claim 6 wherein said first image comprises an image of a diffuser.

8. The hologram of claim 6 wherein said second image comprises an image of a bar code.

9. The hologram of claim 6 wherein said second image comprises an image of a person's face.

10. The hologram of claim 6 wherein said second image comprises an image of alphanumeric characters.

11. A hologram recorded pursuant to an original reference beam at a reference beam angle and an original object beam at an object beam angle, the hologram comprising hologram fringes recorded pursuant to a single exposure for producing (a) a first image that is produced pursuant to playback illumination, said first image being resolvable by human vision when produced pursuant to playback illumination that comprises ambient light, and (b) a second image that is produced pursuant to playback illumination, said second image being displaced from the hologram and unresolvable by human vision when produced pursuant to playback illumination that does not emulate the original reference beam as defined by a grating equation but being machine readable when produced pursuant to playback illumination that emulates a conjugate of the original reference beam as defined by the grating equation.

12. The hologram of claim 11 wherein said first image comprises an image of a diffuser.

13. The hologram of claim 11 wherein said second image comprises an image of a bar code.

14. The hologram of claim 11 wherein said second image comprises an image of a person's face.

15. The hologram of claim 11 wherein said second image comprises an image of alphanumeric characters.

16. A hologram recorded pursuant to an original converging reference beam and an original object beam, the hologram comprising hologram fringes recorded pursuant to a single exposure for producing (a) a first image that is produced pursuant to playback illumination, said first image being resolvable by human vision when produced pursuant to non-coherent broad band playback illumination, and (b) a second image that is produced pursuant to playback illumination, said second image being displaced from the hologram and unresolvable by human vision when produced pursuant to playback illumination that does not emulate the original converging reference beam as defined by a grating equation but being machine readable when produced pursuant to playback illumination that emulates a conjugate of the original converging reference beam as defined by the grating equation.

17. The hologram of claim 16 wherein said first image comprises an image of a diffuser.

18. The hologram of claim 16 wherein said second image comprises an image of a bar code.

19. The hologram of claim 16 wherein said second image comprises an image of a person's face.

20. The hologram of claim 16 wherein said second image comprises an image of alphanumeric characters.

21. An exposure system for exposing a holographic recording layer having a first side and a second side that is opposite the first side, comprising:

object beam means for illuminating the first side of the holographic recording layer with an object beam that produces an optical image of a first object at a first optical image location and an optical image of a second object at a second optical image location displaced from the holographic recording layer, said object beam means including:
    (a) diffuser means for providing a diffuse light output;
    (b) first and second imaging lenses responsive to said diffuse light output for directing imaging illumination to the first side of said holographic recording layer, said imaging illumination producing an optical image of said diffuser means at a diffuser means optical image position located at the holographic recording layer;
    (c) masking means interposed between said first and second imaging lenses;
    (d) said second imaging lens configured such that said imaging illumination further produces an optical image of said masking means at a masking means optical image position displaced from the holographic recording layer; and
  means for illuminating the second side of the holographic recording layer with a reference beam.

22. The exposure system of claim 21 wherein said first optical image location is at the holographic recording layer.

23. The exposure system of claim 21 wherein said optical image of said second object is displaced from the first side of the holographic recording layer.

24. The exposure system of claim 21 wherein said optical image of said second object is displaced from the second side of the holographic recording layer.

25. The exposure system of claim 21 wherein said reference beam comprises a collimated beam.

26. The exposure system of claim 21 wherein said reference beam comprises a converging beam.

27. The exposure system of claim 21 wherein said reference beam comprises a diverging beam.

28. The exposure system of claim 21 wherein said first imaging lens produces an intermediate optical image of said diffusing means between said first and second imaging lenses, and wherein said second imaging lens images said intermediate optical image to produce said diffusing means optical image at the holographic recording layer.

29. The exposure system of claim 21 wherein said first and second imaging lenses produce said diffusing means optical image pursuant to a single image reversal.

30. An exposure system for exposing a holographic recording layer having a first side and a second side that is opposite the first side, comprising:

an imaging lens for directing imaging illumination to the first side of said holographic recording layer, said imaging illumination comprising a first object beam and producing an optical image of a first object at a first optical image position;

means for providing a second object beam to the second side of the holographic recording layer; and means for illuminating the second side of the holographic recording layer with reference beam.

31. The exposure system of claim 30 wherein said first optical image position is at the holographic recording layer.

32. The exposure system of claim 30 wherein said reference beam comprises a converging beam.

33. The exposure system of claim 30 wherein said reference beam comprises a diverging beam.

* * * * *